United States Patent Office 3,157,681
Patented Nov. 17, 1964

3,157,681
POLYMERIC FAT ACIDS
Eugene M. Fischer, St. Paul, Minn., assignor to General
Mills, Inc., a corporation of Delaware
No Drawing. Filed June 28, 1962, Ser. No. 205,835
2 Claims. (Cl. 260—407)

This invention relates to the polymerization of unsaturated fatty acids to provide polymeric fat acids. In particular the invention relates to the use of acid clay catalysts which provide unexpected results in view of the prior art.

These polymeric fat acids find use in the industry for the preparation of polyamide resins and other resin products. For most applications it is desirable that the polymeric fat acids have light color, high acid and saponification values (A.V. and S.V. respectively), and high dimer to trimer ratios. The value of the monomer is enhanced if it has high acid and saponification values, high iodine value (I.V.) and low unsaponifiable (Unsap.) content. When speaking of high acid values and saponification values, this means that the values should be as near theoretical as possible. The theoretical values for a $C_{18}$ fatty acid or for the polymeric fat acid produced from a $C_{18}$ fatty acid would be about 199. A low saponification value on a dimer or monomer would generally indicate that decarboxylation has taken place. If the acid value of the dimer or monomer is lower than the saponification value, this generally indicates the presence of an inter-ester or lactone.

The prior art has employed clay catalysts in the polymerization of fatty acids, utilizing both acid and alkaline clays. In U.S. Patent 2,347,562 to W. B. Johnston the use of natural clays or acid activated clays are shown for the polymerization of fatty acids or esters thereof. The same teaching is found in De Groote patents, U.S. 2,417,738, U.S. 2,426,489 and U.S. 2,450,332. In Morway et al. U.S. 2,673,184, the use of acid clays are shown. This same teaching is found in U.S. Patents 2,793,219 and 2,793,220 assigned to Emery Industries, Inc. In U.S. Patent 2,955,121 assigned to Emery Industries, Inc., the use of alkaline clays is shown. In general the prior art alleges that improved results are obtained with the use of alkaline clays is shown. In general the prior art alleges that improved results are obtained with the use of alkaline clays in contrast to those obtained with the use of acid clays or no clay whatever.

Accordingly, while the use of some acid clay is taught, the use of alkaline clays is alleged to provide superior results. Unexpectedly, however, contrary to the teachings of the prior art, the present invention discloses that certain specific acid clays provide performance equal to and in some instances superior to the performance of the use of alkaline clays. This discovery is entirely unexpected and surprising in view of the allegation of superiority of the alkaline clays. Thus the present invention is an improvement in the field of the use of acid clays for the polymerization of fatty acids.

It is therefore an object of this invention to provide a process of preparing polymeric fat acids employing an acid clay to provide products having properties generally expected by use of an alkaline clay.

It is also an object of this invention to provide an improvement in the process of polymerization of unsaturated fatty acids where acid clays are employed.

Briefly the process of polymerization consists of heating the unsaturated fatty acids, an individual fatty acid or mixtures thereof, derived from oils or fats at temperatures in the range of 180 to 260° C. in the presence of the acid clays hereinbelow described. The usual temperature range employed is 200 to 250° C. with about 230° C being preferred.

The amount of clay employed is not particularly critical, the general range of clay from an economic standpoint being from about 5 to about 25% based on the weight of fatty acids. About 10% is preferred as this appears to provide optimum properties. However, amounts larger than 25% may be employed but such larger amounts do present some operational problems without appearing to provide any proportional benefits. Amounts below 5%, down to as low as 1% are less economical and require extended heating periods.

The process is generally carried out under pressure, the pressure resulting from the presence of volatiles in the fatty acid and clay employed such as moisture. The volatiles generally present will provide pressures of up to 150 p.s.i. The process may be conducted at atmospheric pressures although such is less desirable from an economic standpoint. Usually pressures on the order of 100 p.s.i. are maintained throughout the heating. The process is usually conducted in the presence of small amounts of moisture usually found in the fatty acid or clay employed. With the use of about 10% of clay mineral, about 1–2% moisture will be found present. Additional water may be added, if desirable, particularly at the higher temperatures where some decarboxylation may be encountered. Generally, however, at the pressure generally maintained, about 0.75–1.5% water is present. In general, there is no necessity in having present in excess of 3% water based on the weight of fatty acid.

The time of treatment will, of course, vary with the temperature used and the amount of clay employed; however, generally the time of treatment in a batch process will vary from as low as 1 hour to as high as 8 hours. At the preferred temperature of about 230° C. about 4–5 hours are preferably employed. In a continuous process, time periods on the order of 30 to 60 minutes may be employed.

After the polymerization step, the product is cooled and filtered. The monomeric by-product is then stripped or distilled off, leaving a polymeric fat acid product having a high dimer content, low monomer and trimer content and good color.

Any higher unsaturated fatty acid generally having from 8 to 22 carbon atoms may be employed in the present process. Illustrative of the ethylenically unsaturated acids are the branched, or straight chain, poly- or monoethylenically unsaturated acids such as 3-octenoic acid, 11-dodecanoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fatty acids may also be employed. Such acids, however, occur only rarely in nature and are expensive to synthesize. Accordingly, such are not currently of commercial significance. Illustrative straight or branched chain, mono- or polyunsaturated acids of this type are 10-undecynoic acid, tariric acid, stearolic acid, behenolic acid and isamic acid.

Because of their ready availability and relative ease of polymerization, oleic and linoleic acids are the preferred starting materials for preparation of the polymeric fat acids. Of course, mixtures of fatty acids rich in unsaturated acids may be used. These mixtures of acids may be derived from any common raw material ordinarily used as sources for unsaturated material. Soybean oil, linseed oil, cottonseed oil, safflower oil and fish oils are typical examples of such sources. Tallow fatty acids may also be employed. Saturated material normally occurs associated with the unsaturated material. The saturated acids do not polymerize in the process described. However, separation of the saturated and unsaturated acids before polymerization is not necessary to the practice of the present invention and the polymerization may be carried out in the presence of the unreacted saturated acid. After polymerization, the unreacted material may, if desired, be removed and the product worked up in any conventional manner.

The clays found to provide the unexpected results are montmorillonite, crystalline clay minerals, naturally occurring, having an acid pH of about 5.7 ($\pm 0.8$) and a Karl Fischer moisture content of about 10–17%. As is apparent from the literature, a large variety of clays are available which differ in many respects and that many similar clays varying very little in usual analyses, however, vary greatly as to the type and extent of activity. There is, accordingly, a specificity factor associated with each clay which precludes prediction of how a clay will behave in any given reaction. The exact feature or characteristic of any particular clay which accounts for its behavior is not completely understood, and accordingly, no exact basis exists for distinguishing one clay from another even within the same family, such as montmorillonite. The prior literature sought to distinguish on the basis of pH. However, the present discovery unexpectedly illustrates such feature is not the distinguishing characteristic as the present discovery is based on the fact that two acid clays of the montmorillonite family, although having an acid pH, unexpectedly perform in the same manner as the alkaline clays of the same family.

Accordingly, as it is virtually impossible to distinguish clays from one another on the basis of the usual properties, submitted herewith, as a full disclosure of the clays of the present invention, are specimens of the two clays which provide the unexpected performance.

A sample of each of the two clays was analyzed with the following results based on original clay with moisture removed.

|  | Clay A | Clay B |
|---|---|---|
| $SiO_2$ | 59.12 | 58.40 |
| $Al_2O_3$ | 21.80 | 18.48 |
| $Fe_2O_3$ | 4.50 | 4.51 |
| $FeO$ | 0.18 | 0.20 |
| $MgO$ | 2.32 | 2.06 |
| $CaO$ | 1.40 | 2.00 |
| $Na_2O$ | 0.92 | 0.61 |
| $K_2O$ | 0.72 | 0.24 |
| $TiO_2$ | 0.34 | 0.25 |
| $SO_3$ | 0.45 | 0.22 |

The clays were employed in this invention in the form of a fine powder approximately 90–95% passing through a 200 mesh screen. In addition the clays employed had the following average analysis.

|  | Clay A | Clay B |
|---|---|---|
| Percent moisture (Karl Fischer) | 14.8 | 14.9 |
| pH (of 10% slurry by weight in distilled water) | 5.3 | 5.8 |

The foregoing clays, A and B, originally designated as samples 830 and 843 respectively, are Texas clays located generally in Angelina County near Huntington, Texas. Clay A (830) as herein defined is a clay in a deposit from a tract of land containing 130.14 acres, more or less, the tract being described in a Deed of Trust given by J. O. Baker to Pasadena State Bank and recorded in the County of Angelina records at Lufkin, Texas, in volume 48, page 277. The clay B (843), as herein defined is a clay in a deposit form in the areas described below:

(a) Ten acres out of the Southwest corner of the Dorothy Knierim land in Angelina County, Texas, about two miles East of Huntington, said ten acres being around the outcrop of bentonitic clay on FM 2109 and said Dorothy Knierim land lying approximately 150 yards from the SW corner of the land identified by the abstract No. 429 of Angelina County, Texas, and further description can be obtained from the Angelina County, Texas, records at the court house in Lufkin, Texas, the entire tract containing 213 acres, more or less.

(b) The 213 acres, more or less, in the foregoing abstract No. 429, U. Mendoza Survey, lying approximately two miles East of Huntington, Texas, on FM 2109.

(c) Five (5) acres, more or less, in the Berry H. A. Survey of Angelina County, Abstract No. 92, and ninety-five (95) acres in the J. A. Russell Survey of Angelina County, Texas, Abstract No. 536, all this land containing 100 acres, more or less, being in one tract and lying approximately two miles East of Huntington, Texas, being divided by FM Road 2109, the two parcels of land joining the U. Mendoza Survey on the NE abstract No. 429.

The uniqueness of the two clays in the polymerization process with unsaturated fatty acids will be apparent from the results described below. In all cases, the following procedure was employed:

Two hundred and twenty (220) grams of clay were slurried with 2200 grams of fatty acid (tall oil fatty acids) and loaded into a one-gallon stirred autoclave. The reactor is sealed and the contents heated to 230° C. and held at that temperature for 5 hours. Pressure within the reactor rose to 90–120 p.s.i.g. At the end of the reaction period, the batch is cooled to about 150° C. and vented to 0 p.s.i.g. To remove iron from the product eleven grams of phosphoric acid are added and allowed to mix for one hour. The clay is then removed by filtration. Most of the monomer is then removed by distillation in separate glass apparatus at less than 0.2 millimeter of mercury to the temperature of 250° C. The monomer and dimer fractions are then analyzed. The dimer fraction includes the higher polymeric forms, such as trimer. As used herein, the term "polymeric fat acids" refers to the polymerized product after distillation to remove the monomer fraction as described hereinabove. These polymeric fat acids consist substantially of the dimer (D) plus the higher polymeric forms referred to as trimer (T), with perhaps small amounts of residual monomer (M) which was not distilled off. This is sometimes referred to as "residual dimer." The percent conversion is the amount of D+T (monomer free basis) and indicates the conversion to the polymerized fatty acid product, dimeric and higher polymeric forms. After the distillation of the monomer from the product, the residual monomer in the product will generally be less than 7% of the weight of the final product.

The amounts of monomer (M), dimer (D) and residual higher polymeric forms, trimer (T), are determined by a micro-molecular distillation method described below.

The percent monomer, dimer and trimer is determined by a micro method described in J.A.O.C.S., Paschke, R. F., Kerns, J. R. and Wheeler, D. H., vol. 31, pages 5–7 (1954), using a micro-molecular still and a quartz helix. The iodine value is the centigrams of iodine absorbed per gram of sample and is determined by a rapid Wijs method using chloroform as the sample solvent in place of carbon tetrachloride and a sample size of 0.250 gram or less.

The invention can best be illustrated by means of the results obtained with the use of various clays. The results obtained with Clay A, using the procedure previously described, are illustrated in the following Table I.

TABLE I

| Sample | 1 | 2 | 3 | 4 | 5 |
|---|---|---|---|---|---|
| Clay: | | | | | |
| pH | 5.2 | 5.6 | 4.9 | 5.4 | 5.9 |
| Percent moisture | | 15.9 | 16.6 | 13.8 | 15.0 |
| Percent conversion | 60.0 | 60.0 | 58.7 | 58.7 | 55.9 |
| Dimer Fraction (Polymeric Fat Acids): | | | | | |
| Percent D | 78.4 | 78.6 | 78.8 | 79.3 | 78.0 |
| Percent T | 16.6 | 16.4 | 15.1 | 16.6 | 15.5 |
| Percent M | 5.0 | 5.0 | 6.1 | 4.1 | 5.0 |
| D/T | 4.7 | 4.8 | 5.2 | 4.8 | 5.0 |
| A.V. | 190.9 | 185.5 | 187.4 | 188.0 | 189.3 |
| S.V. | 196.6 | 199.2 | 197.7 | 198.0 | 197.8 |
| Color (Gardner) | 6-7 | 6+ | 7-8 | 7-8 | 7-8 |
| Percent ash | 0.05 | 0.03 | 0.06 | 0.015 | 0.08 |
| Iron, p.p.m | 41 | 73 | 108 | 32 | 135 |
| Phosphorous, p.p.m | | 127 | 193 | 87 | 220 |
| Monomer Fraction: | | | | | |
| A.V. | 173.1 | 170.0 | 166.8 | 172.7 | 172.6 |
| S.V. | 184.4 | 185.6 | 183.1 | 187.1 | 186.9 |
| I.V. | 80.8 | 87.4 | 84.3 | 79.0 | 80.6 |
| Percent Unsap | 7.0 | 7.5 | 7.2 | 6.6 | 6.4 |

The following Table II will illustrate the results obtained with Clay B:

TABLE II

| Sample | 1 | 2[1] | 3[2] | 4[3] | 5[1] |
|---|---|---|---|---|---|
| Clay: | | | | | |
| pH | 5.7 | 5.6 | 5.8 | 6.5 | 5.2 |
| Percent moisture | | 16.2 | 15.6 | 14.7 | 14.9 |
| Percent Conversion | 61.2 | 59.1 | 59.7 | 59.3 | 58.3 |
| Dimer Fraction (Polymeric Fat Acids): | | | | | |
| Percent D | 78.9 | 77.6 | 78.8 | 80.6 | 79.9 |
| Percent T | 17.2 | 17.9 | 17.7 | 15.6 | 16.0 |
| Percent M | 3.9 | 4.5 | 3.5 | 3.8 | 4.1 |
| D/T | 4.6 | 4.3 | 4.5 | 5.2 | 5.0 |
| A.V. | 189.9 | 185.8 | 191.4 | 185.6 | 189.9 |
| S.V. | 198.3 | 199.1 | 198.7 | 199.3 | 197.6 |
| Color | 6-7 | 7 | 7 | 7 | 7-8 |
| Percent ash | 0.03 | 0.04 | 0.025 | 0.07 | 0.04 |
| Iron, p.p.m | 2.2 | 31 | 10 | 63 | 31 |
| Phosphorus, p.p.m | | 11 | 12 | 26 | 9 |
| Monomer Fraction: | | | | | |
| A.V. | 171.7 | 171.9 | 172.6 | 174.3 | 170.2 |
| S.V. | 182.6 | 185.6 | 184.7 | 184.7 | 184.9 |
| I.V. | 79.9 | 89.7 | 87.9 | 84.6 | 88.8 |
| Percent Unsap | 7.3 | 6.6 | 6.5 | 6.5 | 7.2 |

[1] Added 0.5% H₂O by weight based on fatty acids.
[2] Added 0.25% H₂O.
[3] Added 0.25% H₂O and run was made using a mixture of two clays: 40% of a clay with pH of 6.1 and moisture of 15.6%. 60% of a clay with pH of 6.8 and moisture of 14.2%. Average is pH of 6.5 and moisture of 14.7%.

In order to illustrate how the foregoing compare with other clays, the following Tables III and IV are submitted in which the X769 and the Super Filtrol Grade I values are typical of many runs.

TABLE III
*Alkaline Clays*

| Sample | 1 | 2 | 3 | 4 | 5 |
|---|---|---|---|---|---|
| | Millwhite Co. | | | | American Colloid |
| | [1] X769 | 8655 | 8656 | 8657 | Aberdeen |
| Clay: | | | | | |
| pH | 7.5-8.5 | 7.6 | 8.4 | 7.6 | 8.4 |
| Percent moisture | 12-16 | | | | |
| Percent Conversion | 58-60 | 51.1 | 58.5 | 53.7 | 59 |
| Dimer Fraction: | | | | | |
| Percent D | 77-80 | 78.1 | 78.6 | 80.6 | 77.9 |
| Percent T | 15-18 | 16.3 | 17.2 | 16.4 | 15.7 |
| Percent M | 5 | 5.6 | 4.2 | 3.0 | 7.4 |
| D/T | 4.5-5.5 | 4.8 | 4.6 | 4.9 | 5.0 |
| A.V. | 189 | 190.1 | 189.3 | 190.4 | 185.7 |
| S.V. | 199 | 196.5 | 197.1 | 198.6 | 198.3 |
| Color | 6-7 | 7-8 | 6-7 | 6-7 | 6-7 |
| Percent ash | 0.005 | 0.06 | 0.07 | 0.0 | 0.28 |
| Iron, p.p.m | 0-5 | 35 | 53 | 7 | 50 |
| Phosphorous, p.p.m | | 32 | 226 | 51 | |
| Monomer Fraction: | | | | | |
| A.V. | 171 | 174.9 | 178.8 | 176.9 | |
| S.V. | 183 | 187.1 | 185.5 | 187.5 | |
| I.V. | 78 | 86.8 | 84.5 | 94.7 | |
| Percent Unsap | 6.5 | 5.8 | 6.2 | 6.4 | |

[1] Formerly supplied by Bennett-Clark.

TABLE IV
*Acid Clays*

| Sample | 1 | 2 | 3 | 4 | 5 |
|---|---|---|---|---|---|
| | Super Filtrol Grade I | American Colloid White Springs | Millwhite Co. 8658 | Clay X | Clay Y |
| Clay: | | | | | |
| pH | 3-4 | 4.6 | 3.4 | 5.3 | 3.9 |
| Percent moisture | 10-15 | | | | |
| Percent Conversion | 55-57 | 54 | 50.6 | 55.5 | 54.2 |
| Dimer Fraction: | | | | | |
| Percent D | 63-74 | 73.4 | 69.7 | 71.0 | 72.0 |
| Percent T | 21-27 | 24.1 | 22.7 | 23.0 | 21.6 |
| Percent M | 5 | 2.5 | 7.6 | 6.0 | 6.4 |
| D/T | 2.5-3.5 | 3.0 | 3.1 | 3.1 | 3.3 |
| A.V. | 184 | 174.6 | 180.6 | 187.3 | 186.2 |
| S.V. | 195 | 198.5 | 188.0 | 195.1 | 192.8 |
| Color | 10 | 18+ | 10-11 | 12 | 10-11 |
| Percent ash | 0.0 | 0.77 | 0.0 | 0.005 | 0.01 |
| Iron, p.p.m | 0.0 | 4,750 | 0.06 | | 3 |
| Phosphorous, p.p.m | | 385 | 26 | | 12 |
| Monomer Fraction: | | | | | |
| A.V. | 160 | 172.9 | 164.7 | 171.3 | 165.4 |
| S.V. | 185 | 187.7 | 169.3 | 185.8 | 177.2 |
| I.V. | 65 | 80.3 | 41.9 | 67.3 | 54.0 |
| Percent Unsap | 7 | 5.6 | 15.3 | 6.4 | 10.1 |

As seen from the foregoing tables, the clays of the present invention have an acid pH, yet unexpectedly provide results comparable to those of clays having an alkaline pH. While some of the acid clays used for comparison purposes in Table IV may have approached the percent conversion reached by the use of alkaline clays or those of the present invention, it is apparent that, in general, the acid clays provide a dimer fraction having consistently lower acid and saponification values, lower dimer trimer ratios and darker color. In general, the two clays of present invention, provide a dimer fraction having the following typical properties.

Dimer fraction:
- A.V. _____ Not less than 185.
- S.V. _____ Not less than 196.5.
- D/T _____ Not less than 4.0.
- Color _____ Lower than Gardner 8

The embodiments of the invention in which an exclusive property or privilege is claimed are defined as follows:

1. A process of polymerizing higher unsaturated fatty acids comprising heating said acids in the presence of an acid clay selected from the group consisting of Clays A and B having a pH of about 5.7 and a Karl Fischer moisture content of about 10 to 17% and substantially the analysis:

|  | Clay A | Clay B |
|---|---|---|
| $SiO_2$ | 59.12 | 58.40 |
| $Al_2O_3$ | 21.80 | 18.48 |
| $Fe_2O_3$ | 4.50 | 4.51 |
| $FeO$ | 0.18 | 0.20 |
| $MgO$ | 2.32 | 2.66 |
| $CaO$ | 1.40 | 2.00 |
| $Na_2O$ | 0.92 | 0.61 |
| $K_2O$ | 0.72 | 0.24 |
| $TiO_2$ | 0.34 | 0.25 |
| $SO_3$ | 0.45 | 0.22 | thereby providing a polymeric fat acid having a dimer to trimer ratio greater than 4.0, a Gardner color not greater than 8, an acid value not less than 185 and a saponification value not less than 196.5.

2. A process of polymerizing higher unsaturated fatty acids comprising heating said acids at a temperature from 180° C to 260° C. in the presence of from 1 to 25% of an acid clay based on the weight of said acids, said acid clay being selected from the group consisting of Clays A and B each having a pH of about 5.7 and a moisture content of about 10 to 17%, said clays further having substantially the analysis:

|  | Clay A | Clay B |
|---|---|---|
| $SiO_2$ | 59.12 | 58.40 |
| $Al_2O_3$ | 21.80 | 18.48 |
| $Fe_2O_3$ | 4.50 | 4.51 |
| $FeO$ | 0.18 | 0.20 |
| $MgO$ | 2.32 | 2.66 |
| $CaO$ | 1.40 | 2.00 |
| $Na_2O$ | 0.92 | 0.61 |
| $K_2O$ | 0.72 | 0.24 |
| $TiO_2$ | 0.34 | 0.25 |
| $SO_3$ | 0.45 | 0.22 | thereby providing a polymeric fat acid having a dimer to trimer ratio greater than 4.0, a Gardner color not greater than 8, an acid value not less than 185 and a saponification value not less than 196.5.

References Cited in the file of this patent

UNITED STATES PATENTS

| 2,450,332 | De Groote | Sept. 28, 1948 |
| 2,793,219 | Barrett et al. | May 21, 1957 |
| 2,793,220 | Barrett et al. | May 21, 1957 |